(12) United States Patent
Buesgen

(10) Patent No.: US 6,575,201 B2
(45) Date of Patent: Jun. 10, 2003

(54) FABRIC WITH A VARIABLE WIDTH

(76) Inventor: Alexander Buesgen, Alleehaus/Shape 3, Friedrich-Engels-Allee 161a, 42285 Wuppertal (DE)

( * ) Notice: Subject to any disclaimer, the term of this patent is extended or adjusted under 35 U.S.C. 154(b) by 0 days.

(21) Appl. No.: 09/423,564

(22) PCT Filed: May 11, 1998

(86) PCT No.: PCT/EP98/02736
§ 371 (c)(1),
(2), (4) Date: Nov. 10, 1999

(87) PCT Pub. No.: WO98/51845
PCT Pub. Date: Nov. 19, 1998

(65) Prior Publication Data
US 2003/0056846 A1 Mar. 27, 2003

(30) Foreign Application Priority Data
May 11, 1997 (DE) .......................... 197 19 218
Mar. 27, 1998 (DE) .......................... 198 13 630

(51) Int. Cl.⁷ .............................. D03D 3/02; D03D 3/06
(52) U.S. Cl. .................. 139/367 R; 139/192; 139/386; 139/384 R
(58) Field of Search ..................... 139/192, 387 R, 139/386, 384 R

(56) References Cited

U.S. PATENT DOCUMENTS

| | | | |
|---|---|---|---|
| 2,705,977 A | * | 4/1955 | Verne et al. .............. 139/192 |
| 2,974,687 A | | 3/1961 | McFetters |
| 3,016,068 A | * | 1/1962 | Felix .......................... 139/11 |
| 3,132,671 A | * | 5/1964 | Koppelman et al. ........ 139/192 |
| 4,025,684 A | | 5/1977 | Neidhardt |
| 4,640,317 A | | 2/1987 | Chardon et al. |
| 5,592,977 A | * | 1/1997 | Kikuchi et al. ......... 139/387 R |
| 5,634,499 A | * | 6/1997 | Kikuchi et al. ......... 139/387 R |

FOREIGN PATENT DOCUMENTS

| | | |
|---|---|---|
| DE | 23 21 612 A | 11/1974 |
| DE | 39 15 085 A | 11/1990 |
| EP | 0 145 615 A | 6/1985 |
| EP | 0 431 664 A | 6/1991 |
| FR | 1 490 531 A | 11/1967 |
| FR | 2 213 363 A | 8/1974 |
| GB | 943 062 A | 11/1963 |
| GB | 2 309 038 A | 7/1997 |
| JP | 07 238433 A | 9/1995 |

* cited by examiner

Primary Examiner—John J. Calvert
Assistant Examiner—Robert H. Muromotol
(74) Attorney, Agent, or Firm—Alston & Bird LLP

(57) ABSTRACT

A weaving method and apparatus for producing a length of fabric which has a variable width, wherein the sheet of warp threads is guided in the area of the shed with a space between the warp ends which is enlarged or reduced according to the desired width of the fabric. The fabric is guided by a spreader device (19) at least on both of its longitudinal edges and preferably directly after the stroke of the weft yarn. The effect of the spreader devices on the width of the fabric is controlled synchronously with and substantially proportional to the enlargement (spread) and reduction (contraction) of the space between the warp ends. Seamless and seamed tubes with variable diameters can be produced using the inventive method.

25 Claims, 11 Drawing Sheets

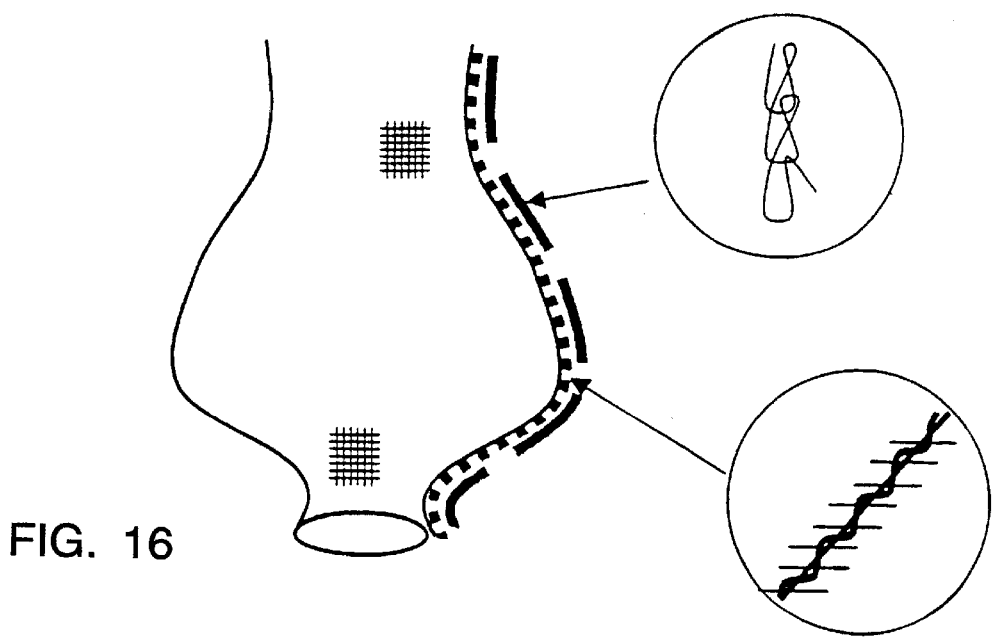
FIG. 16
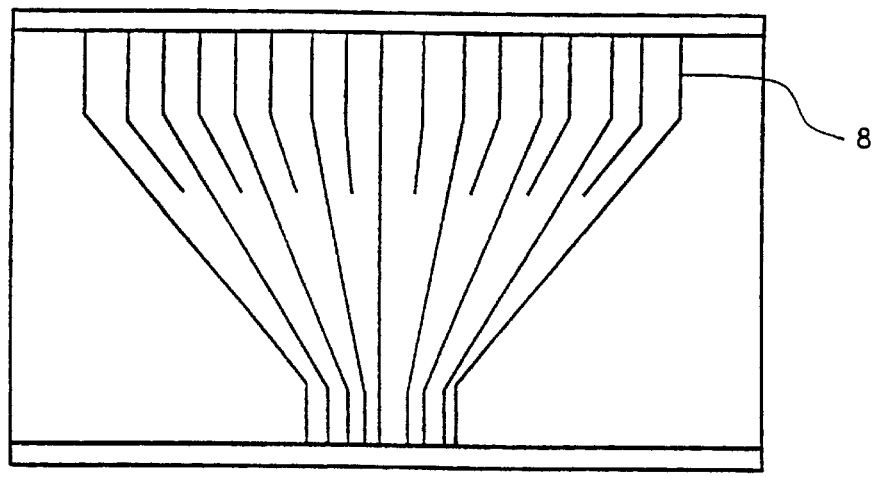
FIG. 7.6
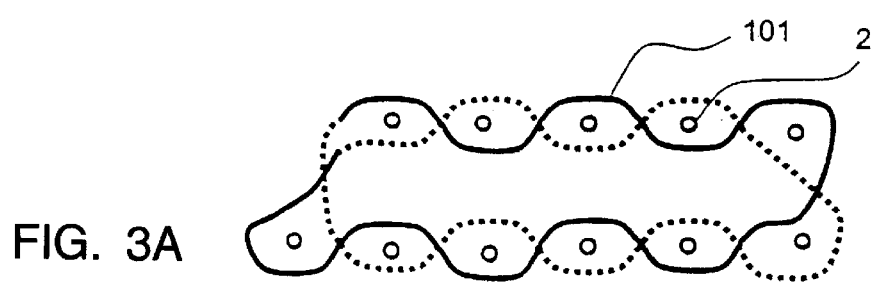
FIG. 3A

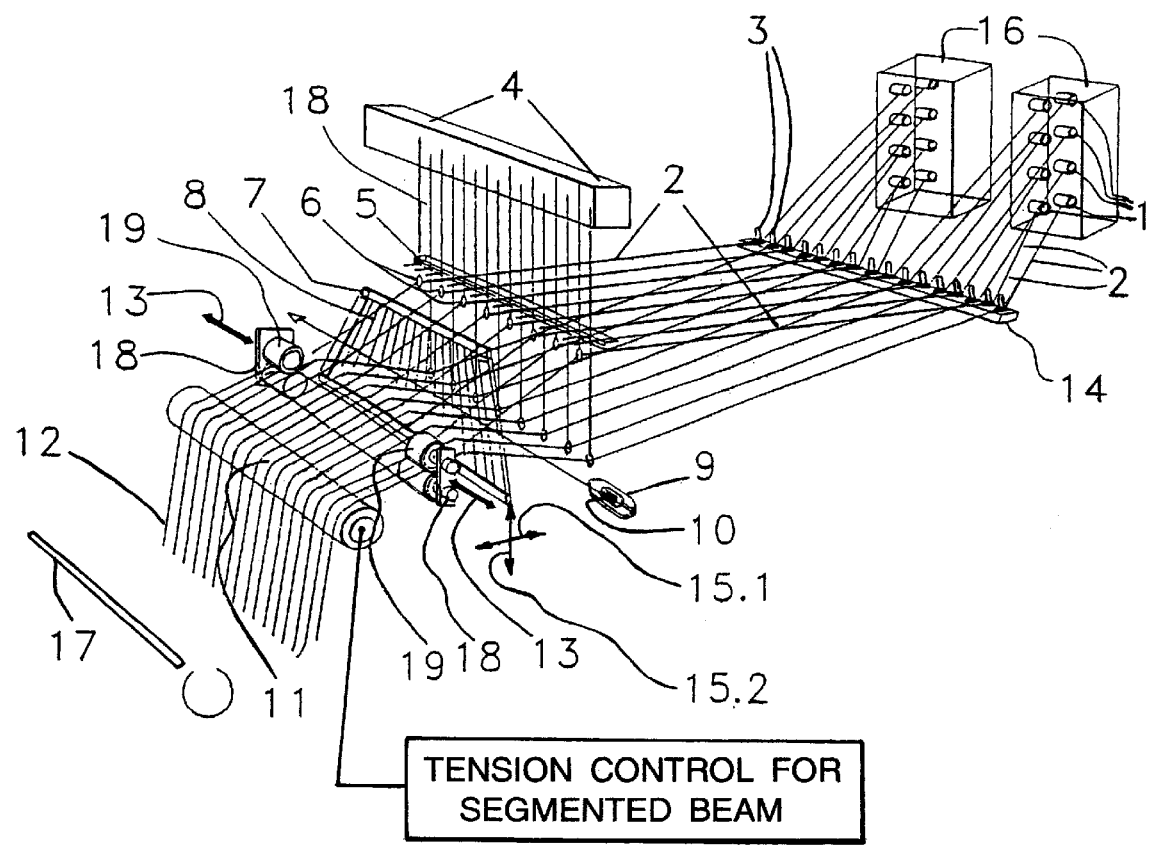
FIG. 5.1

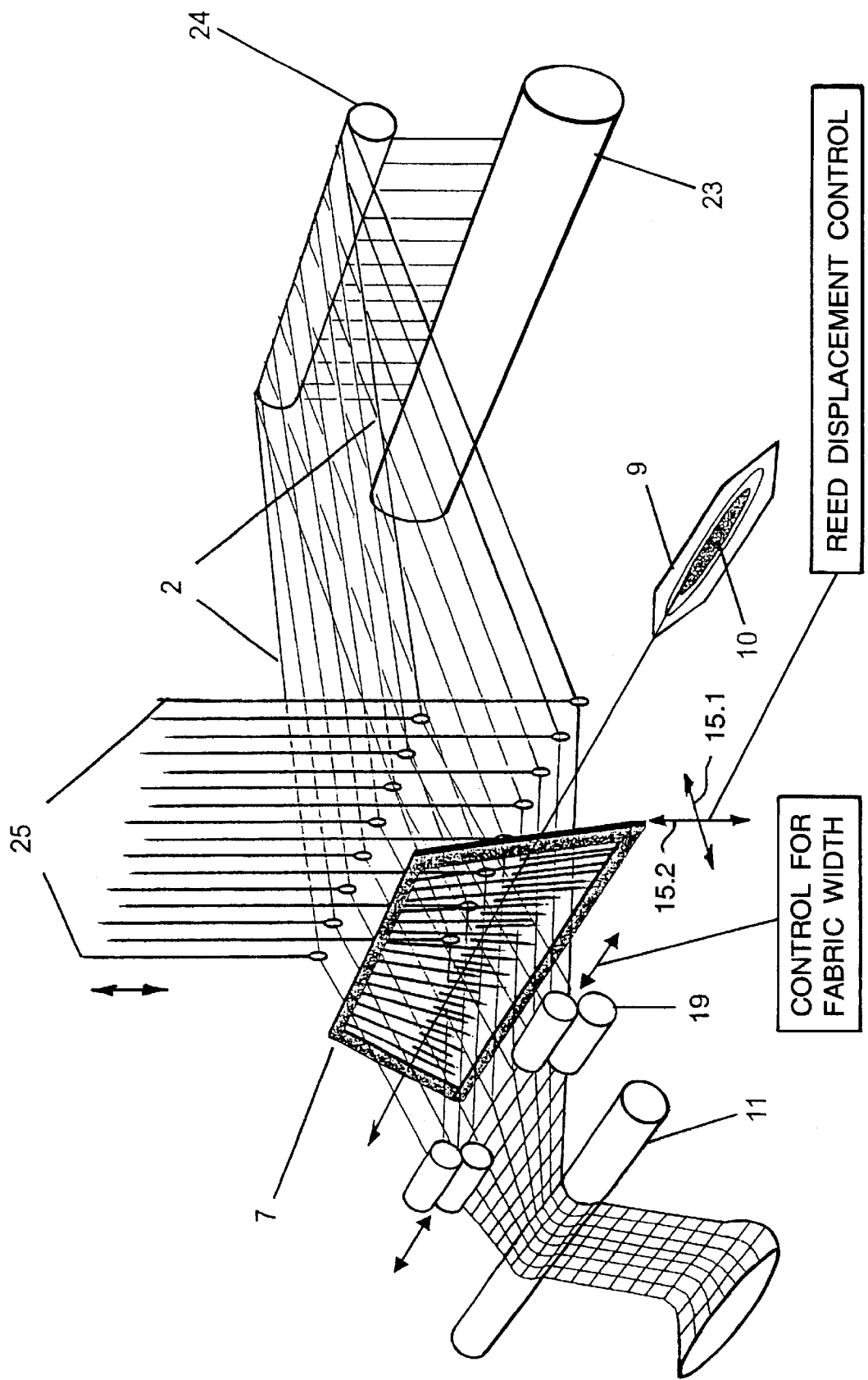
FIG. 5.2

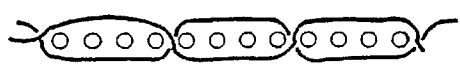
FIG. 6
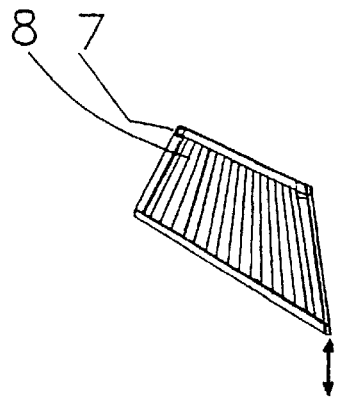
FIG. 7.1
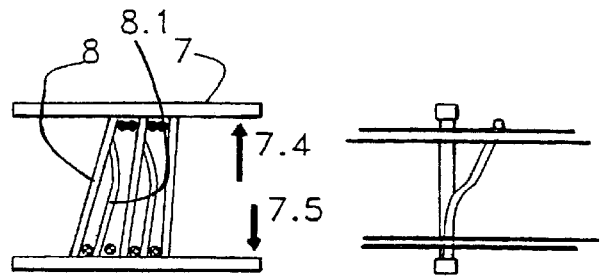
FIG. 7.2   FIG. 7.3
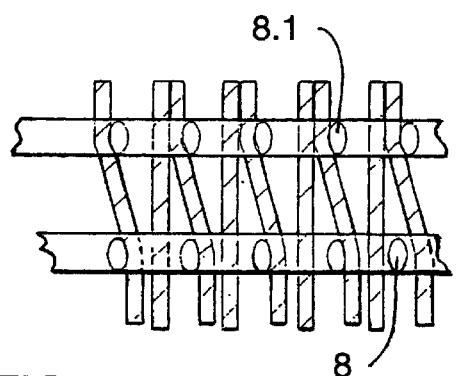
FIG. 7.4
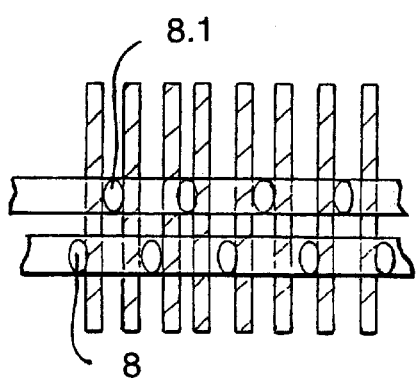
FIG. 7.5
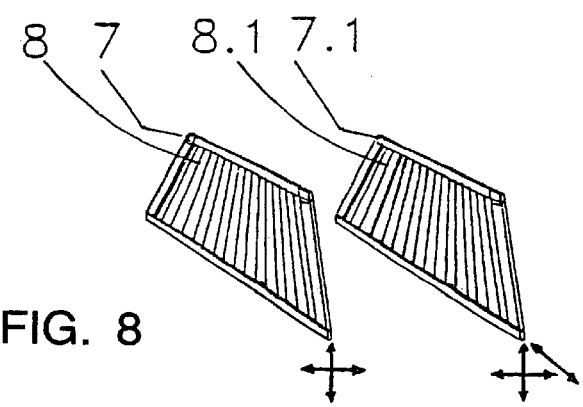
FIG. 8

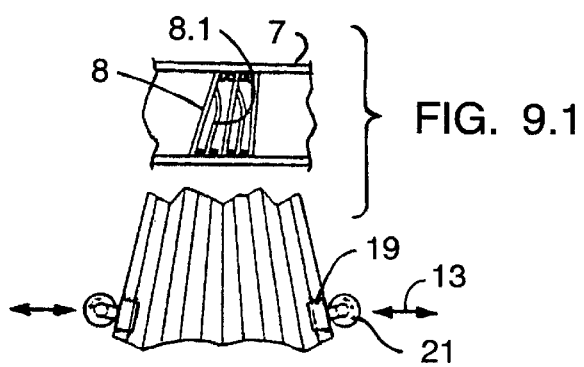
FIG. 9.1
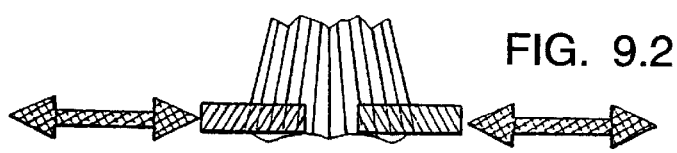
FIG. 9.2
FIG. 9.3
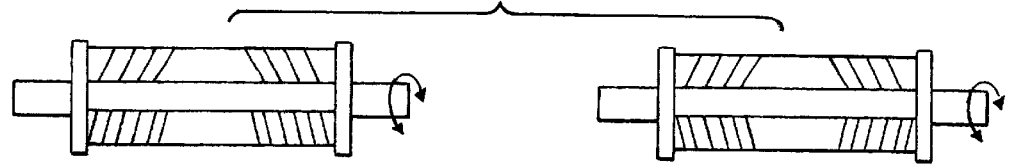
FIG. 9.4
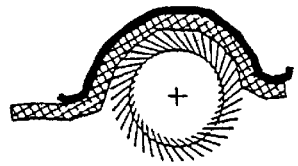
FIG. 9.5
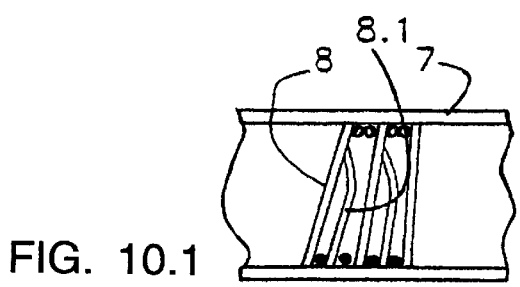
FIG. 10.1
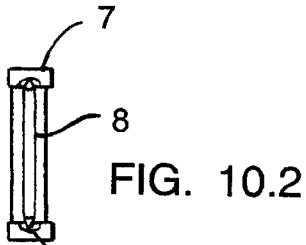
FIG. 10.2
ROTATABLE MOUNTING
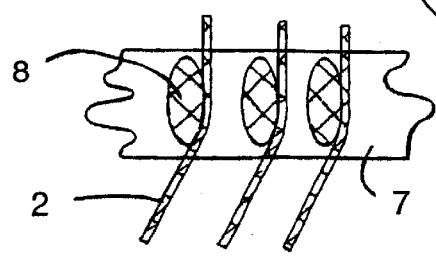
FIG. 10.3

FABRIC WITH A VARIABLE WIDTH

BACKGROUND OF THE INVENTION

The present invention relates to a weaving method and an apparatus for producing a fabric with variable width.

JP 7-238433 discloses a woven tube whose diameter is changed along the length in that weft threads of different elasticities are inserted in the warp direction.

Fabrics can be produced both as a two-dimensional, one-layered sheet and in the form of multi-layered, thicker structures. Woven tubes with diameters variable along their lengths could up to now not be produced without seams because the known methods for changing the width of the fabric are not applicable in this case.

One possibility for changing the width of the fabric resides in the concentration and spreading of the warp threads. In doing so, the overall number of the warp threads in the fabric remains constant. Of course, the width of the fabric and thus possibly also the diameter of a woven hollow space is changed in the process; however, the spreading and also the contraction of the lateral distance between the warp threads are resisted by the warp thread tension, the weft insertion and the weft thread tension, which is inevitable and for other reasons even desired. The spreading and thus the contraction are thus not stable and will essentially be lost during the weaving. Therefore, a desired change of width cannot be easily performed.

It is an object of the invention to provide a weaving method and a weaving apparatus which is able to produce a stable fabric of threads, especially weft threads, of uniform elasticity and stretchability and with a width that can be varied along the length of the fabric, particularly a tube-shaped fabric whose diameter varies along the length, and in such a manner that very considerable changes of width can be performed per length unit. The change of diameter is to be effected not by the elasticity and stretchability of the threads but by the weaving method itself.

SUMMARY OF THE INVENTION

The above and other objects and advantages of the invention are achieved by the provision of a weaving method and apparatus wherein the reed is displaced so as to change the warp thread spacing and thus the width of the advancing fabric in accordance with a predetermined program which represents a desired fabric width which varies along the length of the sheet of warp threads. At least the two opposite edges of the formed interwoven fabric are engaged with spreader devices which impart a width guiding effect to the engaged opposite edges. Also, the width guiding effect is adjusted as a function of the desired fabric width.

The invention offers the advantage that the spreading of the fabric, which is per se known and usual, is utilized actively here for adapting the lateral warp thread position and the weft-thread deposit and tension to the width of the fabric. This makes it possible to obtain strong conical enlargements or reductions of the fabric width which will be permanently applied to the fabric structure and be rigidified therein.

The terms "spreaders" or "spreader devices" are used herein to designate known devices which exert a spreading effect on the fabric.

Particularly preferred are spreaders which are used only on the edges of the fabric. Such spreaders are e.g. needle-equipped circular cylindrical rollers arranged for free rotation in the region of the edge of the fabric. The edge of the fabric is guided via these rollers while partially wound around them. The end faces of the rollers are preferably arranged in parallel to each other but inclined to a radial plane of the rollers. This results in an outward conveying effect. According to the invention, these rollers, with respect to the fabric width, are displaced toward the outside or the inside synchronously and substantially proportionately to the spreading or contraction of the warp thread distance.

Further known are spreaders in the form of non-rotating or rotating rods extending across the width of the fabric. These are e.g. rods wherein the circumference contacting the fabric is provided with grooves facing toward the outside in the direction of the production of the fabric.

When producing fabrics with varying width, the closest contraction depends on the largest possible warp thread density. When spreading such a warp thread sheet, the problem occurs that the warp threads will not become distributed in a uniform manner across the spread fabric width. This problem is solved by the weaving method wherein two or more immediately adjacent warp threads are guided without mutual tying as is the case e.g. with a longitudinal filling rep with 4 warp ascents and 4 warp descents. Such a tying offers the advantage that the friction between the warp threads and the weft threads is low so that the warp threads also after the weft insertion can be distributed across the fabric width due to their inherent tension.

A special form of the fabric is the circular or tube fabric. A tube is woven e.g. in that two fabric layers are produced to lie above each other, being connected only in the edge regions.

In prior methods for weaving tube-like structures, a constant fabric width is generated. The diameter of the woven hollow space, mostly a woven tube, will thus be constant. In many applications, however, a hollow-space-forming fabric is desired which has a more or less tapering diameter or a constant conicity between two different diameters or widths. Examples thereof are fiber reinforcements for poles (sail or surf masts, supporting buttresses) which in the upper region have a small diameter and down to the base have a gradually increasing diameter. Other examples are golf clubs and many light construction rods and supporting arms in industry.

Conically tapering structures with hollow spaces can up to now be produced only by the winding method or the braiding method. The winding method is very time-consuming and is restricted by the danger that threads on the winding core might slide off. The winding method is not suited to place threads in the circumferential direction of a tube and thus is confined to torsion-stressed applications.

The disclosed embodiments of the invention have the object to produce a woven structure which forms a hollow space, e.g. in the manner of a tube, and whose threads extend in the axial and circumferential directions, and whose hollow space increases or decreases in the direction of the warp threads.

In one embodiment, the shuttle weaving technology is of advantage since, in this case, the weft thread, while being uncut, will alternately tie the upper and the lower fabric layers so that a seam region will not be generated on the circumference of the woven tube.

When use is made of narrow fabric needle loom automats, the weft thread on one end of the fabric has to be attached by a crochet edge which will cause a more or less distinct protrusion in the warp direction.

Also the use of modern high-performance rapier weaving machines is made possible by the simultaneous production of a plurality of bands or tubes with variable width or variable diameter. This machine also permits the production of a tube shaped fabric with two longitudinal seams, and the material-saving production of a plurality of bands or tubes with variable width/variable diameter. Through an embodiment wherein the edge region of the fabric layers is connected by a crocket edge, the seam region of the tube is reinforced so that the tube can also be subjected to high pressures inside.

An embodiment of the invention makes it possible to produce bands or tubes which, while having a variable width on the one hand and resp. a variable diameter on the other hand, are also curved along their length. For this purpose, use can be made e.g. of conical take-off rollers. Of particular advantage, however, is the use of take-off rollers separated into segments, wherein each segment conveys one or a group of warp threads and wherein the individual segments can be driven at a controllable speed which is different from segment to segment. In this regard, reference is made to DE Patent 39 15 085.

An embodiment of the invention makes it possible that the number of warp threads per width unit is compensated for by removal of warp threads through measures from binding technology and resp. inclusion of warp threads into the binding.

Individual warp threads or groups of warp threads can temporarily remain in the upper shed or lower shed position while the other warp threads are woven or tied up. Thus, these threads will temporarily float. In such places where these threads are again tied into the fabric, there is generated a tendency of an enlargement of the fabric width and resp. of the width of the woven hollow space or of the tube diameter. Advantageously, use is made of a jacquard machine with individual thread control.

Very steep changes of the fabric width are made possible by the weaving method wherein the weft tension is controllable. The increase of the weft thread tension leads to a contraction of the warp threads and also to a changed fabric width. Of advantage in this regard is a controllable weft thread brake which will break the weft thread to a higher extent at certain points of time and to a lower extent at other points of time.

The spreading or contraction of the warp thread distance is advantageously performed by a reed with variable dent spacing. In this case, the reed dents can be arranged for lateral movement on the reed frame. The lateral displacement can provide the required space for the warp threads in a passive manner, i.e. without further drive means. However, use can be made also of an active displacement through a drive means which will laterally guide and position the reed dents.

Alternatively, a fan weaving reed with non-parallel reed dents wherein the reed dents diverge in the manner of a fan in the vertical direction and which can be adjusted in height. Both embodiments of reeds are described and illustrated e.g. in DE 39 15 085 A1.

The configuration of the reed dents disclosed herein is useful for the reduction of thread friction and thread damage in case of a massive spreading or contraction of the warp thread distance.

When using a reed with laterally adjustable reed dents or a vertically adjustable weaving reed with non-parallel, i.e. fan-like reed dents, it is to be considered that, in the area of the largest contraction, it is not possible to accommodate as many reed dents across the smallest fabric width as required for guiding the warp threads. Thus, between two reed dents, a number of warp threads must be inserted which is too large for a proper guidance. In the height region with enlarged distance, i.e. large thread spreading, a sufficient lateral guidance is lacking so that the uniform distribution of threads will become problematic then.

To solve this problem, additional guiding rods are arranged between reed dents. The warp threads, while being distributed in a uniform manner, are pulled both into the interspaces (main openings) between the main reed dents and into the interspaces (additional openings) between the additional reed dents. In the region of the contraction, the guiding rods are neutral, i.e. they do not guide the warp threads upon beat-up. In the region of the spreading, however, they enter the main openings and serve for the substantially uniform distribution of the warp threads accommodated there.

The additional guide dents can be arranged on the reed or be provided as the reed dents of a further reed (additional reed). It is also possible to provide these two reeds in an identical configuration and to cause the additional reed to be slightly offset laterally, i.e. by less than one reed unit (opening width), in its upper position effecting the spreading.

The tube-shaped fabric woven from warp and weft threads according to the invention is configured to form, from two fabric layers arranged on each other, a hollow space which under the influence of an internal pressure takes on a substantially circular cross section, with the diameter varying along the length of the fabric tube. In this regard, it is accomplished according to the invention that the mutually overlying fabric layers are connected to each other so tightly that they will withstand also to high internal pressures, with the fabric layers on the edges merging without seams into each other by means of the endlessly inserted weft thread, forming a seamless hollow space with variable width or variable diameter, while the fabric layers in the region of the hollow space are not connected to each other.

For this purpose, the conventional shuttle weaving technology is of particular advantage. By this weaving technology, the whole weft bobbin is conveyed through the weaving shed and thus will form a so-called "true" edge, i.e. the weft thread is not severed on the edge but is folded over and inserted into the following shed. In various bindings, e.g. the tabby hollow weave, use is made of this condition. In such cases, the weft thread is alternately inserted into an upper and a lower fabric layer. The completed fabric thus has a tube-like structure with seam regions since the upper layer on the edge will merge into the lower layer without interruption. When combining this manner of generating the hollow spaces with the proposed width variations, one will obtain a seamless woven tube with different diameters.

Tube-shaped fabrics and particularly such fabrics with variable diameters cannot be bent in the inflated condition and cannot be inflated in a bent condition. The method wherein the drawing off of the warp sheet is varied across the width of the fabric, makes it possible to produce such a fabric. This fabric is distinguished in that the distance of the binding points between the warp and weft threads increases from the one edge to the other edge of the two tube-forming fabric layers and preferably increases in a linear manner so that the fabric is bent in the longitudinal direction in a plane. Such a bent "hollow" fabric is also advantageous as a tube having a constant width in the longitudinal direction and resp. of constant diameter when the tube is to be inflated. In this manner, the shape that the tube is to take in the inflated condition can be determined by weaving. If the curvature is not determined by weaving, the tube will develop folds and take on a random shape in the inflated condition.

It should be noted that also more than two layers can be woven above each other, e.g. three layers. This will result in two hollow spaces or chambers extending in the warp direction. Also then, the desired changes of the width will also cause a contraction or widening of the hollow spaces.

BRIEF DESCRIPTION OF THE DRAWINGS

Embodiments of the invention will be described in greater detail hereunder with reference to the drawings, in which:

FIGS. 3 and 3A illustrate the generation of a hollow space by shuttle weaving technology;

FIGS. 5.1 and 5.2 are perspective views of weaving machines which embody the present invention;

FIGS. 6, 6A and 6B are views of the weave binding;

FIG. 7.1 is a view of a fan weaving reed for the spreading and resp. condensing of warp threads;

FIG. 7.2 is a front view of a fan weaving reed with additional dents;

FIG. 7.3 is a lateral view of the fan weaving reed according to FIG. 7.2;

FIG. 8 are views of main and additional fan weaving reeds;

FIG. 9.1 is a view of a spreader;

FIG. 9.2 illustrates the controlling of the spreader;

FIGS. 9.3, 9.4 and 9.5 are views of different embodiments of the spreader;

FIGS. 10.1 and 10.2 are front and side views of rotatable reed dents;

FIG. 10.3 is a sections view of elliptic reed dents;

FIG. 16 is a view of a hollow fabric with stitch-seam, auxiliary-thread and cross weaves of the warp threads.

Figure 1:
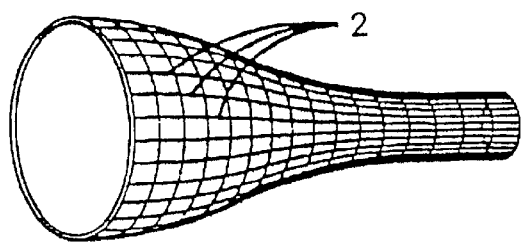
FIGS. 1, 1A, 1B and 2C are views of fabrics with hollow spaces of varying diameters.

In the drawings, the numerals are meant to designate:

| 1 | Warp bobbins |
|---|---|
| 2 | Warp threads |
| 3 | Brakes |
| 4 | Jacquard control means |
| 5 | Warp thread positioning device |
| 6 | Eyelet, final eyelet |
| 7 | Weaving reed, reed, main reed |
| 7.1 | Additional reed |
| 8 | Reed dents, staves |
| 8.1 | Additional dents |
| 9 | Shuttle, Schiffli unit, gripper, weft needle |
| 10 | Weft bobbin |
| 11 | breast beam, product take-off device |
| 12 | fabric, product take-off device |
| 13 | carrier movement of the carrier |
| 14 | Brake control means |
| 15 | Weaving reed movement |
| 15.1 | Weaving reed movement, advance movement to the weft thread beat-up |
| 15.2 | Weaving reed movement for changing the fabric width |
| 16 | Creel |
| 17 | Batching device |
| 18 | Carrier |
| 19 | Cylinder spreader, roller, clamping roller, spreader |
| 20 | Fabric plane, fabric layer |
| 21 | Carrier |
| 22 | Carrier |
| 23 | Warp beam |
| 24 | Back rest |
| 25 | Shafts |
| 28 | Fabric plane, fabric layer |
| 101 | Weft thread |
| 102 | Leno thread |
| 103 | Positioning of the leno device |
| 104 | Edge region, leno selvedge |
| 105 | Auxiliary thread |
| 106 | Latch needle |
| 107 | Positioning of the latch needle |
| 108 | Operation of the latch needle for stitch formation |
| 109 | Insertion movement of the weft insertion needle |

DETAILED DESCRIPTION OF THE PREFERRED EMBODIMENTS

Production of a Seamless Tube-shaped Fabric

FIGS. 5.1 and 5.2 show weaving machines with their elements which are necessary for the practicing of the present invention in the production of a seamless tube fabric. The following description applies to all of the illustrated weaving machines unless differences are explicitly stressed.

In FIG. 5.1, individual warp bobbins 1 are presented to the weaving machine. The warp bobbins 1 are creeled on a creel 16. The warp threads 2 are drawn off the bobbins and then guided individually through the individual elements of the weaving machine. In this application, reference is sometimes made only to one warp thread; however, it should be noted that this can always also mean a group of two or three or more warp threads. Instead of individual warp bobbins, a warp beam 23 comprising a plurality of warp threads is presented to the weaving machine according to FIG. 5.2, and these are then guided via the back rest 24. When producing a tube-shaped fabric, also two or more warp threads can be presented.

First, according to FIG. 5.1, each warp thread is guided through one of the brakes 3. Each brake can be set individually. This can be performed manually.

Each brake 3 comprises a lower plate and an upper plate. Each warp thread 2 is drawn along between such a lower plate and such an upper plate. The lower plates are arranged in a fixed position; the upper plate is attached to the rod of an electromagnet and can be pushed against the lower plate with a force which can be preset. The electromagnets are individually or collectively addressed by a braking means according to a braking program. Thereby, the braking force and the thread tension in the warp threads 2.1 can be adjusted differently. On the other hand, the adjusted individual warp thread is also dependent on the draw-off mechanism 11 and the draw-off speed thereof, as the program steps of the braking program unit are fetched depending on the draw-off speed of the warp thread. It is a matter of course that the brakes are constantly adjustable even during the weaving process.

In FIG. 5.1, the jacquard control 4 serves to move the warp threads up and down. Harness cords 18 are suspended in this jacquard control 4. From the harness cords 18, heddles are suspended, and eyelets 6 are suspended from these. The eyelets are moved upwards by the harness cords and the jacquard control and brought into an upper position (upper shed). The eyelets 6 are connected downwards by rubber strings (not shown), wherethrough the eyelets are drawn against the force of the jacquard control into a lower position (lower shed).

The warp thread positioning means 5 is arranged in front of the eyelets 6. By means of this warp thread positioning means, the harness cords 4 or heddles 19 or eyelets 6, respectively, are positioned laterally such that the eyelets substantially have the same distance as the warp threads running through the weaving reed 7 (see below).

Each warp thread is guided behind its brake through an eyelet of the eyelets 6 each. By means of the jacquard control 4, each warp thread is moved, independently of the other warp threads, into the upper shed or the lower shed according to the program of a jacquard program unit 22.

The weave structure of the fabric as well as the number of tied up threads depends on the jacquard control, i. e. on which ones of the warp threads are moved to the upper or the lower shed in each filling.

It is to be noted that also a dobby machine as schematically indicated in FIG. 5.2. is suited for practicing the instant invention.

The weaving reed 7 is arranged behind the jacquard means and the shafts, respectively.

The weaving reed 7 is a frame in the shape of a trapezoid or a parallelogram. Between the upper edge and the lower edge running parallel thereto, dents 8 (staves) are fitted such that the dents spread apart from the upper edge in the shape of a fan. Such a weaving reed is shown in DE 39 15 085 A1, for example. Each warp thread is guided through a space between the dents 8. The forward movement 15.1 of the weaving reed, by means of which the last weft thread is pressed to the edge of the fabric after each filling (commonly referred to as "beat-up"), and the backward movement of the weaving reed 15.1 are caused by the machine control, e. g. a crank mechanism (not shown).

By means of the slow upward or downward movement 15.2 of the weaving reed, the lateral distance of the warp threads in the weaving reed and therebehind is determined.

Already the positioning means 5 guides the warp threads through the eyelets of the jacquard means with the lateral distance predetermined by the weaving reed.

The upward and downward movements 15.2 are controlled by the weaving reed control according to a predetermined program.

Further, in FIG. 5.2—better than in FIG. 5.1—it can be seen that additional reed dents are arranged between the main reed dents in the region of the large spreading of the main reed dents. These additional reed dents serve for better guidance and distribution of the warp threads while these are guided through the reed in the region of the large spreading and are beat up. These additional reed dents are preferably also provided in the embodiment of the weaving machine according to FIG. 5.1 and will still be described in greater detail. The weft insertion of the weft thread takes place between the weaving reed and the completed fabric. In FIGS. 5.1, 5.2, a shuttle 9 is preferably used for this purpose. The weft thread is drawn off the weft bobbin 10 and guided through the shed. Other weft insertion systems are possible but do not allow for the production of fabric tubes. This will be discussed later.

The resulting fabric 12 can be drawn off by individual gripping devices. A breast beam 11 is employed here. Possibly required clamping rollers which will clamp the fabric on the breast beam, are not illustrated here for reasons of clarity. The fabric in the process of being generated is clamped between the driven breast beam and the freely rotatable opposite rollers. The breast beam be divided, in the longitudinal direction, into individual segments—not shown here—which are respectively assigned to a warp thread or a group of warp threads, as described in DE 39 15 085 A1. The fabric can then be wound onto a cloth beam 17.

Figure 14A:
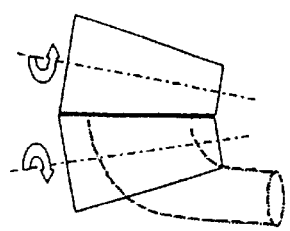
FIG. 14A is a view of a breast beam for producing a curved fabric tube.
Figure 14:
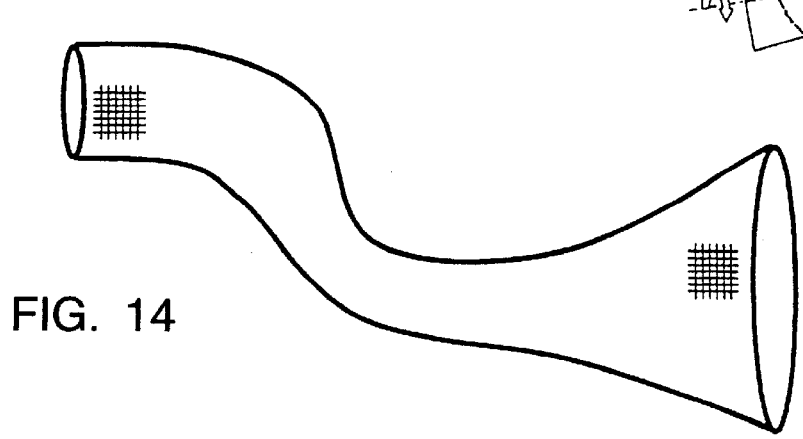
FIG. 14 is a view of a curved fabric tube.
Figure 4A:
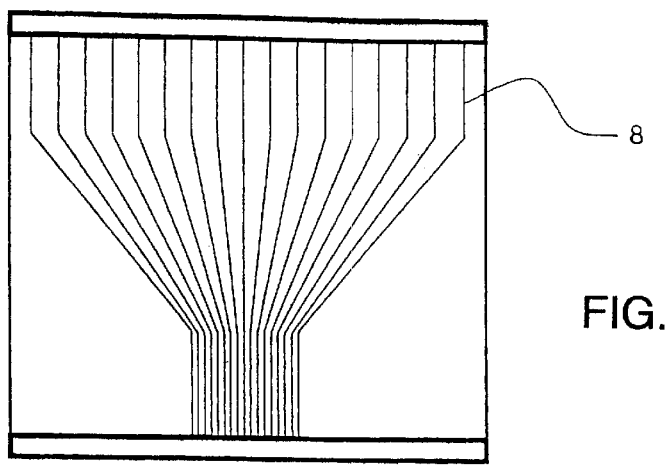

It is possible to produce a one-layered or tube-shaped fabric which is curved or bent in the longitudinal direction and which can have an increasing or decreasing width in the longitudinal direction, as shown in FIG. 14. For this purpose, the individual segments are driven at a speed that increases from one end to the other end of the breast beam.

Instead of dividing the breast beam in the above manner into individual segments which are assigned to respectively one warp thread or a group of warp threads and are driven at a speed increasing from one side to the other, take-off can be performed by use of a conical roller or a pair of conical rollers as a breast beam, which then however will not admit a controlling of the curve. Such a breast beam is shown in FIG. 14A. The advantages of such a curved tube-shaped fabric are described above.

The fabric edges are guided through a respective spreader. In FIGS. 5.1 and 5.2, pairs of clamping rollers 19 are used as spreaders, which will give the respective fabric edge a movement component directed outside or inside to the center of the fabric. Further spreaders which can be used by way of alternative are described below with reference to FIGS. 9.1–9.5. The spreaders are located as close as possible to the fabric edge and in any case before the breast beam 11.

Temporarily Effective Guidance of the Warp Threads

Figure 4:
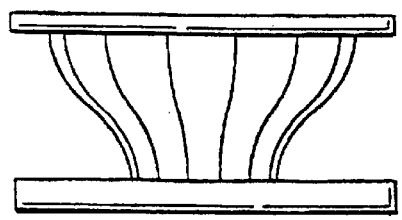
FIGS. 4 and 4A are views of a fan weaving reed for the spreading and resp. condensing of warp threads.
Figure 1A:
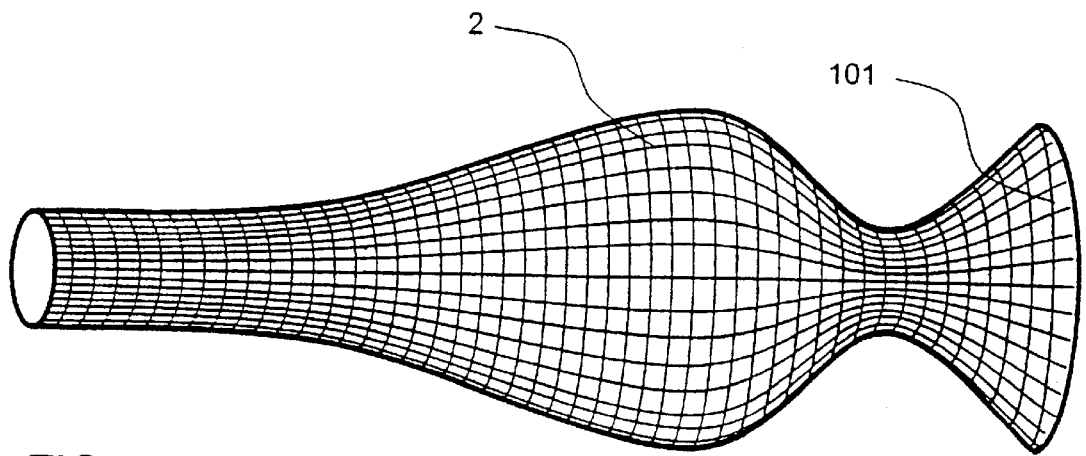

FIG. 4 schematically shows a fan weaving reed for the spreading and resp. condensing of warp threads wherein the reed dents are not linear but bent in the reed plane.

Figure 6B:
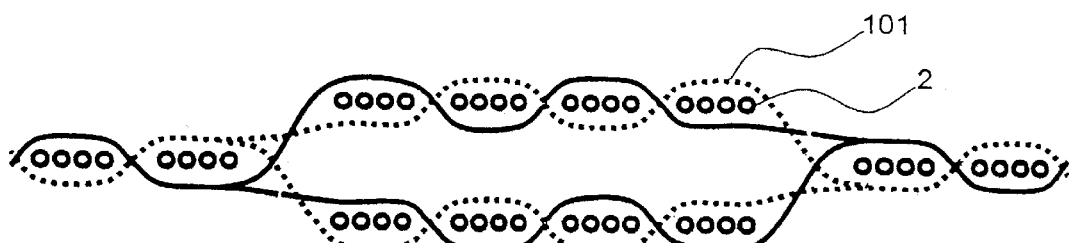
Figure 6A:
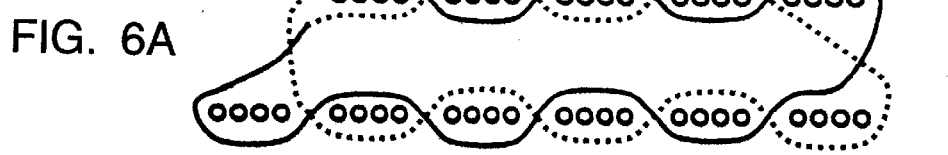

Upon extreme changes of the warp thread density during the weaving, the number of warp threads guided through a reed gap will be determined by the smallest woven width or the smallest diameter of the tube. Here, for instance, 32 threads have to be placed in one reed gap because the width of the reed dents themselves already occupies too much space so that only very few reed dents can be installed. In the thus tapered fabric or tube zones, the very densely packed warp threads can be well guided and, upon beat-up of the weft thread, be positioned at a uniform distance in the fabric. During and particularly after the spreading of the warp threads, however, undesired gaps are formed between the warp threads because, due to the spread distance between the reed dents, too few reed dents exist for a uniform distribution of the warp threads across the fabric width. To avoid this disadvantage, the following measures can be taken:

a) Bindings which comprise relatively few points of intersection in the weft thread direction. A longitudinal filling rep with 4 warp ascents and 4 warp descents is an example thereof. Although, in this case, the threads will still accumulate on the reed dents arranged toward the center of the fabric, they will then slide into a relatively uniform distribution due to the thread tensions prevailing in the fabric. Such a binding is shown in FIGS. 6, 6A and 6B. There exist each time 4 warp threads effecting the same binding. Since these identically binding warp threads will also after the beat-up of the weft thread have a relatively low friction with respect to the weft thread, they can still be distributed in a uniform manner across the fabric width after beat-up under the influence of the fabric tensions. This type of binding is also advantageous independently of the control of the spreading in order to produce fabrics with a heavy variation of the width or tube with strong contractions. Depending on the extent of the variation, such a binding is also an indispensable precondition. FIG. 6A illustrates that such a binding for the production of seamless fabric tube can be used particularly also to obtain a variable diameter along the length of the tube. FIG. 6B shows that such a binding can be used for the production of a fabric tube—particularly also with a variable diameter along the length of the tube—wherein two layers of warp threads are tied in common in the edge regions of the fabric and separately between the edges. This is explained in greater detail in the description of FIG. 11.

b) Guiding of the warp threads by additional reed dents which are effective only in the position of the reed in which the reed distances are large and the warp threads are spread so heavily that there is danger of the formation of gaps. Useful for this purpose are a special fan weaving reed, two specially formed reeds, two identical but specially movable reeds.

Special fan weaving reeds are shown in FIGS. 5.2, 7.1 to 7.5 and 7.6.

The reed in these cases is a fan reed 7 (see also FIGS. 5.1 and 5.2) with frame and main reed dents 8. The reed dents diverge from top to bottom (or vice versa) in the manner of a fan. Thus, the distances between the reed dents become larger when the reed is moved into its upper position and the warp threads are spread wide apart.

Further, these special reeds comprise additional reed dents which in the wide fabric portion lie in the gaps between the "main reed dents". The additional reed dents are attached on the lower long traverse, notably centrally in the opening between two adjacent main reed dents. From there, they first extend in the center of this opening in the direction of the upper traverse.

In the embodiment according to FIGS. 5.2 and 7.6, these additional reed dents extend only over part of the reed height. It cannot be illustrated that those ends of the additional reed dents which point towards the upper traverse, have a respective guide thread attached thereto of which the other end is guided on the upper traverse centrally in the opening between the adjacent main reed dents and then is fixed in position. In the lower position of the reed, the threads are not tensioned. The warp threads, while distributed in a uniform manner, are pulled into the openings which are formed respectively between a reed main dent and the adjacent additional reed dent or the thread attached thereto. Since the threads are not tensioned in the lower position of the reed, the warp threads can freely move here in the opening between two adjacent man reed dents without guidance by the threads. When the reed is moved into the upper position so that the warp threads are spread to attain a large width, the threads are tensioned, and the warp threads slide off the threads into the openings respectively between one main and one additional reed dent. Even in case of a wide spreading of the warp thread sheet, this will result in a good guidance and distribution upon beat-up of the weft thread on the fabric edge.

In the embodiment according to FIGS. 7.2/7.3, the additional reed dents 8.1 are likewise attached only on the long—here the lower—traverse of the frame. As shown in the front view of the reed according to FIG. 7.2, these additional reed dents are shaped such that, in the region of the large distances between the reed dents 8, they once more divide the distance between the main reed dents 8 while being arranged—as evident from FIG. 7.3—in the same plane or near the plane of the main reed dents. Further, in the small fabric portion, these additional reed dents are arranged to extend behind the main reed dents so that—as evident from the front view of the reed according to FIG. 7.2—they disappear behind the main reed dents 8 in the region of the small distances between the reed dents 8, i.e. they are arranged substantially on the same vertical line or the same vertical plane of the reed as the main reed dents 8. Further, in this region, the additional reed dents—as evident from the side view of the reed according to FIG. 7.3—are bent from the plane of the main reed dents 8 against the warp thread direction and are inclined obliquely to this plane. Thus, upon beat-up of the weft thread, the warp threads are guided only between the main reed dents when a small fabric width is generated. When the reed is moved into the opposite position for generating the large fabric width, the additional reed dents will fulfill their function, and, upon beat-up of the weft threads, the warp threads are guided in the openings between the main reed dents and the additional reed dents.

An embodiment with two reeds is shown in FIG. 8.

These reeds are arranged behind each other in parallel planes. As to their upper and lower positioning—and preferably also as to the beat-up of the weft thread—they are controlled synchronously. Additionally, also the distance of the rear additional reed to the front main reed can be controlled.

In the instant embodiment, the main reed and the additional reed are identical with respect to the arrangement of the reed dents. However, the additional reed can further perform a lateral movement which can amount up to the half of the largest separation of the main reed dents. This movement is carried out synchronously with and substantially proportionately to the upper/lower position of the reeds.

In a dual reed with specially shaped reed sheets (not to be illustrated), the first reed (main reed) facing towards the abutment edge of the fabric has large reed gaps, i.e. few reed dents to provide space for the small fabric width. The second reed (additional reed) is arranged between the first one and the shafts or the harness heddles. This reed has smaller reed gaps and guides the threads in a spread condition. Only in this spread condition, the second reed is beat up together with the first one. When weaving a small fabric width, the second reed remains on the most rearward position directly before the first heddles.

The reed dents of the additional reeds are shaped as described earlier for the additional reed dents according to FIGS. 7.2 and 7.3, with the sole difference that the additional reed dents are attached on both traverses of the additional reed dents. However, it is also possible that the additional reed dents—although having the shape and arrangement described with reference to FIG. 7.2, i.e. the additional reed dents are shaped to disappear behind the main reed dents 8 in the region of the small distances between the reed dents 8—they will once again divide the distance between the main reed dents 8 in the region of the large distances between the reed dents 8. Further, as described with reference to FIG. 7.3. the additional reed dents can be shaped such that they are arranged close to the plane of the main reed dents in the region of the small distances, and that, in the region of the large distances, between the reed dents 8, they diverge from the plane of the main reed dents 8 against the warp thread direction and are inclined obliquely to this plane.

If no use has been made of this arrangement described with reference to FIG. 7.3, i.e. if the additional reed dents are arranged in a common additional reed plane, the additional reed can increase or decrease the distance to the main reed synchronously with the upward/downward movement.

In all of these embodiments, there is obtained a thread guidance which will be described hereunder with reference to FIGS. 7.4 and 7.5.

FIGS. 7.4 and 7.5 show vertical sectional views of the reed dents 8 and the additional reed dents 8.1, notably:

FIG. 7.4 during contraction of the warp threads and as viewed in the direction of arrow 7.4 (FIG. 7.2), and FIG. 7.5 while spreading the warp threads and as viewed in the direction of arrow 7.5 (FIG. 7.2).

In the lower position of the reed according to FIG. 7.1 and resp. the reeds according to FIG. 8, i.e. upon contraction of the warp thread distance, the additional reed dents 8.1 disappear behind the main reed dents 8 so that the additional reed dents have no guiding function. The additional reed dents are arranged on the same line (warp line), pointing in the warp thread direction and being vertical to the reed plane, as the main reed dents. When two warp threads are pulled into an interspace (opening) between two main reed dents, respectively one of these warp threads is pulled through a corresponding opening of the additional reed arranged on the same warp line while the other one is pulled through the opening adjacent thereto. In the process, the main reed plane and the additional reed plane have a large distance so that the guided warp threads will present only a small binding angle on the main and resp. additional reed dents.

In the upper position of the reed (FIG. 7.1) and resp. the reeds (FIG. 8), i.e. upon spreading the warp thread distance, the additional reed dents 8.1—as shown in FIG. 7.5—are arranged in the spaces between the main reed dents 8 so that the additional reed dents together with the main reed dents form openings into which the warp threads—one respective group of warp threads at regular intervals—are pulled in uniform distribution. When using identical reeds, this is effected by the described lateral movement of the additional reed.

Simultaneously with the lower positioning, the additional reed plane will be arranged as close as possible to the main reed plane to obtain a good distribution and guidance of the warp threads upon beat-up of the weft thread and the thus obtained binding of the warp threads. This is performed either by the special shape of the additional reed dents or—when using identical reeds—by the described movement of the additional reed in the warp direction.

These functions can be obtained also through a fan weaving reed provided with controllable additional reed dents as described and illustrated in DE 39 15 085 A1.

In the wide fabric portion, the reed dents take a position between the main dents, and in the small fabric portion, they are controlled to move behind the main dents. This can be accomplished e.g. in an eccentric. Alternatively, the additional reed dents are temporarily shifted between the already existing reed dents.

Reed Embodiment for Gentle Fiber Handling

Further advantages are obtained by a reed embodiment for gentle fiber handling. Due to the extreme spreading/condensing on the reed dents, the warp threads are very strongly deflected and thus subjected to friction. Especially the outer threads are damaged thereby. Elements for gentle fiber handling can be:

elliptically shaped reed dents: in this regard, reference is made to FIG. 10.3. The longitudinal axes of the ellipses are arranged in the warp direction. The advantage of this sectional shape of the reed dents resides in the avoidance of a sharp guiding site—here an edge—around which the warp threads are unavoidably guided at angle and under tension. By an elliptical shape of the reed dents, the sharp-edged guidance is avoided and a considerably larger guiding radius is obtained.

rotatably supported reed dents: in this regard, reference is made to FIG. 10.2. The linear reed dents and additional reed dents are supported for rotation about their longitudinal axis so that each friction and each reduction of the thread tension due to guidance is avoided.

coated reed dents to reduce the friction coefficient.

Guidance of the Fabric Edge

The invention makes it possible to perform considerable changes of width during the weaving in that the guidance of the fabric and resp. of the two fabric edges will support the change of width. Otherwise, damage to the fibers has to be expected which would be contrary to the use of a weaving method with varying fabric width. To avoid damage to the fibers and to be able to effect jumps in width as quickly as possible, the fabric, while being generated, is to be guided on both outer edges, or the fabric is to be guided across the whole fabric width corresponding to the currently woven width. This fabric guidance occurs between the most recently inserted weft thread and the cloth take-off. A position very close to the most recently inserted weft thread is of advantage.

Basically, a difference has to be made between spreaders which grip only the two fabric edges (spreaders of the first type) and spreaders which extend across the whole fabric width (spreaders of the second type).

According to the invention, the first type of spreaders 19 is arranged on a carrier 18 which is movable and positionable in the direction of the fabric width. Thus, the distance of the spreaders 19 can be adapted to the current weaving program with respect to the fabric width and can be changed synchronously with the warp thread distance and the thus effected fabric width.

This control of the spreaders is illustrated in FIGS. 5.1, 5.2 9.1.

As a carrier, use can be made e.g. of a threaded bushing, wherein the threaded spindle extends across the width of the fabric and has its ends provided with threads of opposite pitches. By rotating the threaded spindle, the distance of the two carriers can be adapted to the respective current weaving width.

It is also possible to adjust the carrier and the spreader to the inclination of the fabric edge relatively to the take-off direction of the fabric, as schematically indicated in FIG. 9.1. In this manner, the orientation and effect of the spreader can be still more closely adjusted to the respective fabric width to be woven and to the change of the fabric width.

According to the invention, it is provided for the second type of spreader that at least two spreaders with different—particularly opposite—spreading effects are used and are alternately brought into engagement with the fabric in dependence on the current weaving program and while adapted to the warp thread distance and to the thus effected fabric width.

As elements of the first type, there can be used:

laterally adjustable cylinder spreaders. These can be positioned e.g. on a threaded bar by rotating the same. FIG. 9.5 shows an element of a cylinder spreader. This is a freely rotatable roller having its circumference equipped with needles. In the guiding region of the fabric, the needles are surrounded by a holding-down device which presses the fabric onto the needle tips.

laterally adjustable grooved rods. These rods stand still and are partially enclosed by the fabric edges. They are provided inward or outward grooves arranged to tension the fabric in the width direction.

As elements of the second type, there can be used:

a fixed roller with guide grooves, which extends across the fabric width. The guide grooves are facing towards the direction of the generation of the fabric, with a component in the direction of the width. This component can be of a varying extent and can be directed outward for enlarging the width and inward for decreasing the width so that, by use of different rollers, also opposite spreading effects can be obtained (FIG. 9.3).

fixed rollers with differently convex and/or concave covers (FIG. 9.4).

Carriers with such rollers are shown in FIGS. 9.3 and 9.4. In FIG. 9.3 (left-side alternative), the two rollers are provided with grooves facing outward relative to the take-off direction. The inclination is different in the two rollers. In the right-side alternative in FIG. 9.3, the inclinations of the two rollers are opposite to each other.

In FIG. 9.4, the carrier has a concave and a convex roller mounted thereon. Due to this form, the rollers have different and opposite spreading effects when held in contact with the tissue.

By rotating the carriers, the rollers (FIGS. 9.2;9.3) can be alternately brought into contact with the fabric. Obtained thereby is an adaptation of the spreading effect to the respective width and the current width change.

Figure 2:
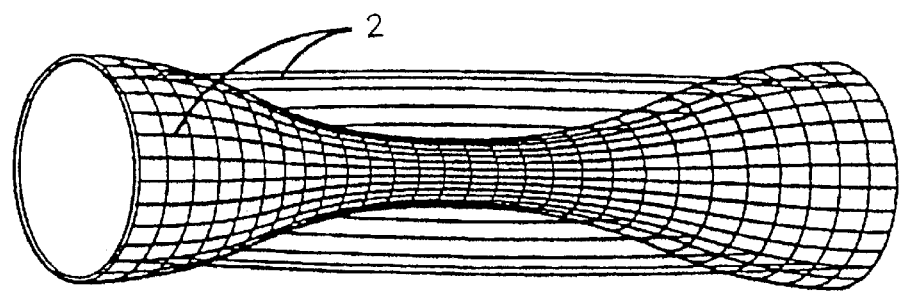
FIGS. 2, 2A and 2B are views of the conicity obtained by removing or adding warp threads.
Figure 2A:
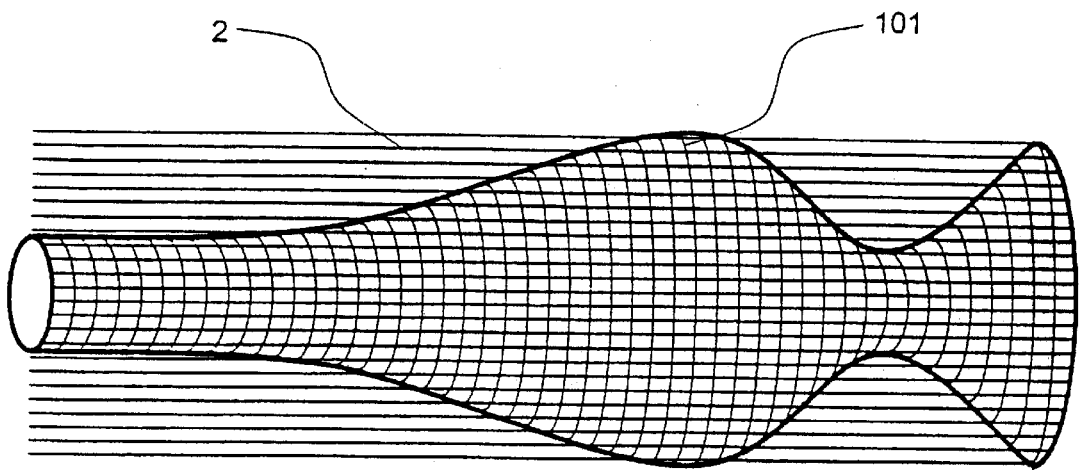
Figure 1B:
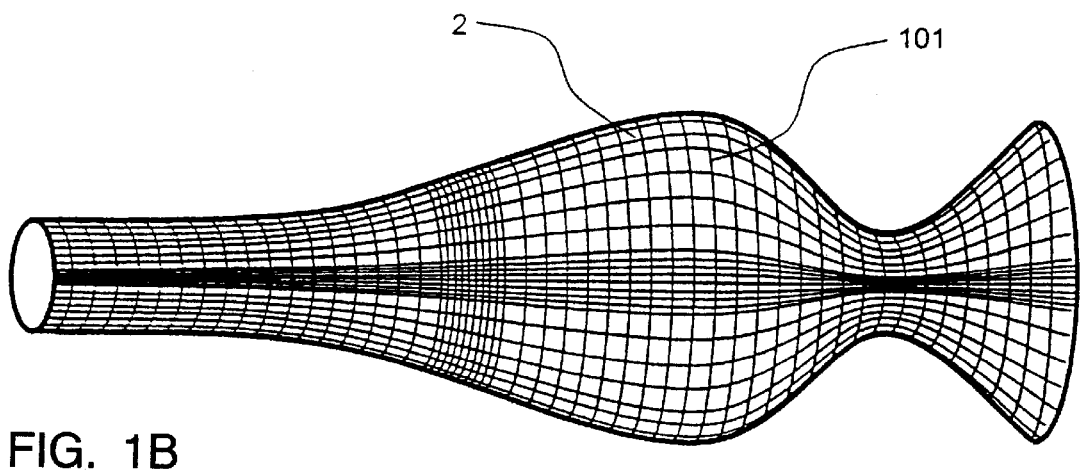
Figure 2B:
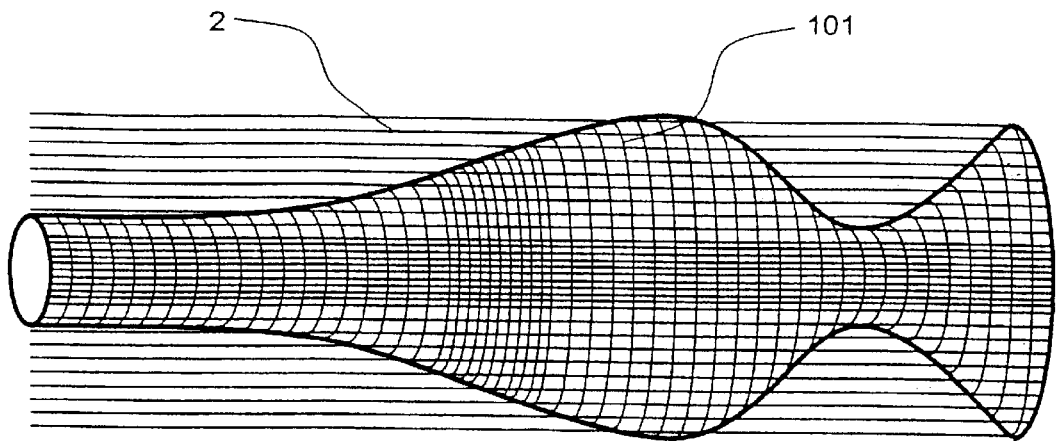
Figure 2C:
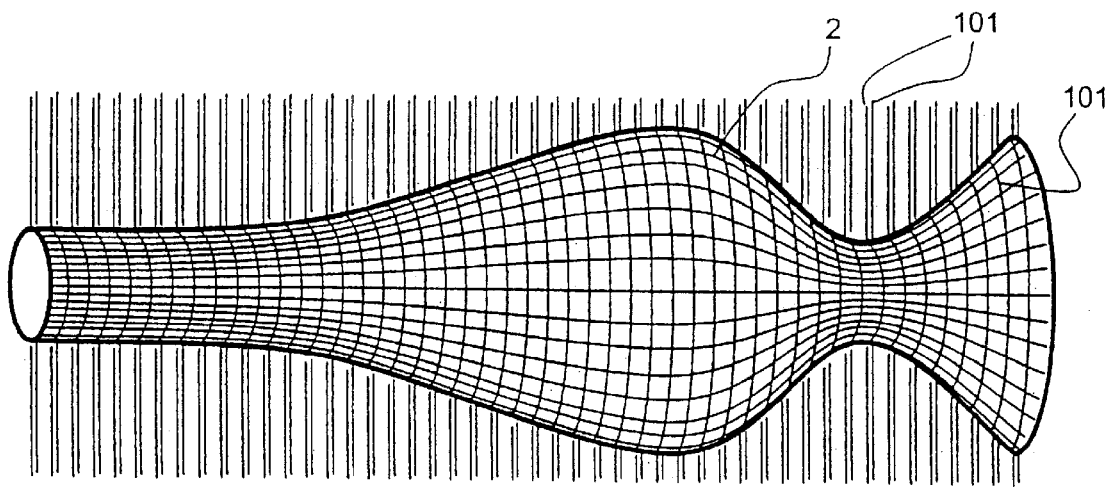

According to the invention, fabrics can be produced whose width varies considerably along their length. These fabrics can be bands. Particularly, it is possible to produce tube-shaped fabrics as illustrated by way of example in FIGS. 1, 1A, 1B and 2C as well as 2, 2A and 2B. These can be conical or double-conical tubes which are produced with warps in the longitudinal direction and with wefts in the transverse direction. In such a fabric with a hollow space, the diameter varies along the length. In the fabric according to FIG. 2, 2A,2B, the conicity is enhanced by the removing and resp. including of warp threads from or into the weave so that warp threads in the region of smaller diameters will not be tied up, i.e. will float. Thereby, the number of the tied warp threads can be adapted to the respective fabric width, and the warp thread density of the tied warp threads can be kept substantially constant or be controlled independently of the fabric width. FIGS. 1B and 2B further show that the density of the warp threads across the fabric width can vary. Additionally, also the density of the weft thread crossing points along the fabric length can be controlled differently and be adapted to the requirements.

Figure 3:
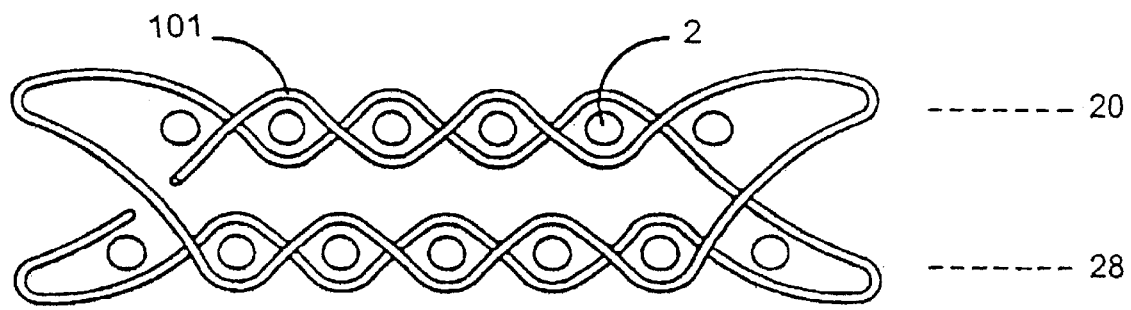

FIGS. 3 and 6A illustrate the generation of a hollow space by shuttle weaving technology. The warp threads are assigned alternately to the upper and the lower fabric layer 20 and 28, respectively. Then, the warp threads of the two fabric layers will alternately form the shed for the weft thread insertion by (weaver's) shuttle so that the weft thread on its outbound path will tie up the warp threads of one fabric layer 20 and on the return path will tie up the warp threads of the other fabric layer 28, and so forth. In the process, the weft thread will not be cut on the fabric edges. Therefore, the fabric layers 20, 28 merge endlessly into another on the longitudinal edges.

This method can be performed on the looms according to FIGS. 5.1 and 5.2 and by the described reeds in that the warp threads are correspondingly distributed among the two fabric layers and the Jacquard machine and resp. the shafts are controlled such that the shed for the weft threads is formed alternately by the threads of one fabric layer and those of the other fabric layer.

Production of a Tube-shaped Fabric with Seam

The invention is also suited for the production of tube-shaped fabrics with variable width/variable diameter which are provided with one or two longitudinal seams.

As to the production of a tube-shaped fabric with two longitudinal seams, reference is made to FIGS. 11, 6B and 12, 12A.

Figure 11:
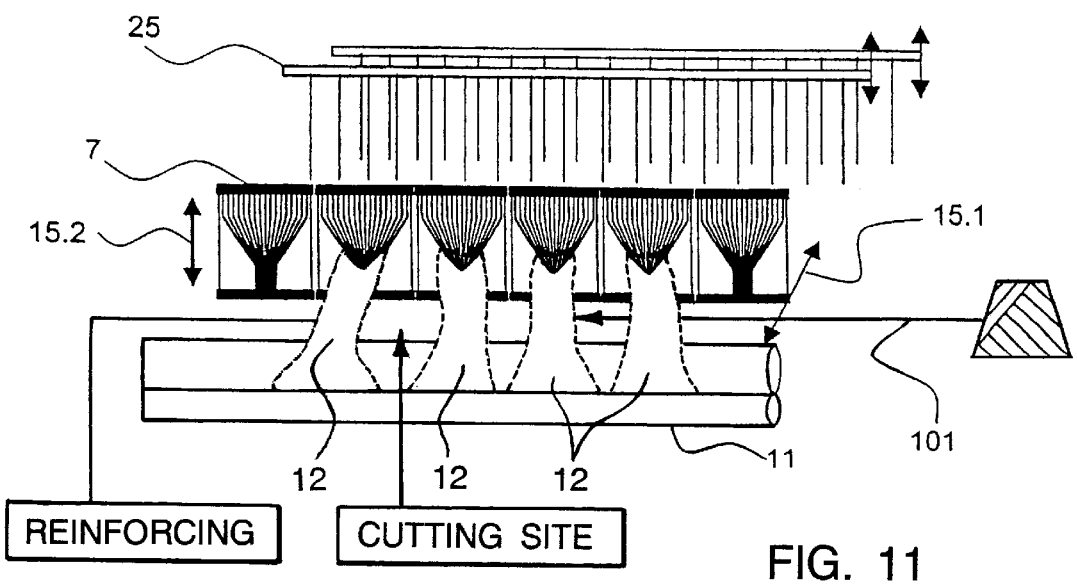
FIG. 11 is a schematic view of a rapier weaving machine.

FIG. 11 schematically shows parts of a rapier tape loom with two shafts 25 for shed formation of two fabric layers. The sheet of the warp threads is divided into six partial sheets. Each partial sheet can be separately adjusted with respect to the warp thread distance through respectively one reed of the configuration e.g. according to FIG. 7.6 by upward or downward positioning of the respective reed. The weft thread insertion of the reeds on the fabric edge is performed synchronously after insertion of the weft thread into the shed formed synchronously for all partial sheets. For this purpose, the weft thread 101 is inserted by means of grippers (not shown) across the whole width of the warp thread sheet. The warp threads are assigned to two fabric layers which in the central region of each partial sheet are opened toward the shed alternately from one weft insertion to the next. Thus, the warp threads assigned to the two fabric layers in this region will be tied up only in one fabric layer. In the edge regions of the outer partial sheets and in the intermediate regions between the adjacent partial sheets, however, the warp threads participate together in the shed formation. Thus, the warp threads are here tied into a sole fabric layer, cf. particularly FIG. 6B.

Figure 15:
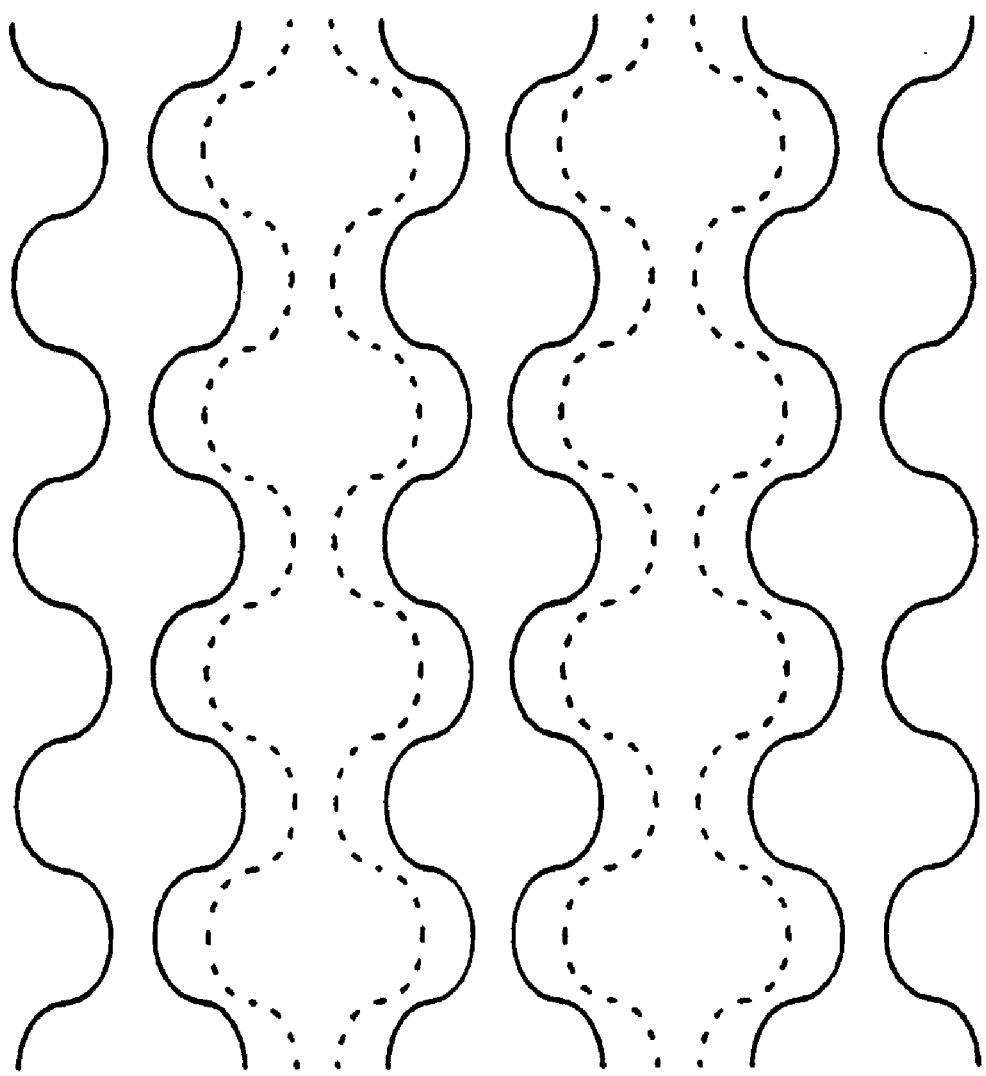
FIG. 15 illustrates the change of width of adjacent partial sheets.

As mentioned above, the warp thread distance of each partial sheet can be controlled by upward and downward positioning. This control is performed preferably in the manner evident from FIG. 15: The width change of adjacent partial sheets is performed with such a phase shift that, with increasing width of a partial sheet, the width of the adjacent partial sheet is reduced. In the ideal case, it can be achieved that the total width of the warp thread sheet remains substantially constant. This method saves material and clippings. After weaving, the intermediate regions are severed in the longitudinal direction, thus generating tube-shaped bands of different widths.

Figure 12A:
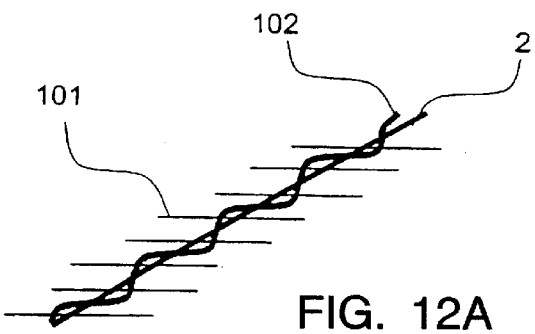
FIG. 12A is a view of a cross weave.

As schematically indicated in FIG. 12A, the warp threads of the two fabric layers in the edge or intermediate regions can be connected to each other in the manner of a cross weave. As to cross weaves and the generation of leno selvedges, reference is made to the book by Martin Kienbaum, "Bindungstechnik der Gewebe, Band 3: Dreher, Falten-, Flor- und Jacquardgewebe", publ. Schiele & Schön, Berlin, 1966. By the cross weave, the stability of these edge and resp. intermediate regions 104, which form a seam on both sides of the respective tube, is increased, and the woven tube can be subjected to an internal pressure without the tube bursting due to disintegration of the edge region. The still uncut fabric is then pulled off through a common breast beam.

Figure 12:
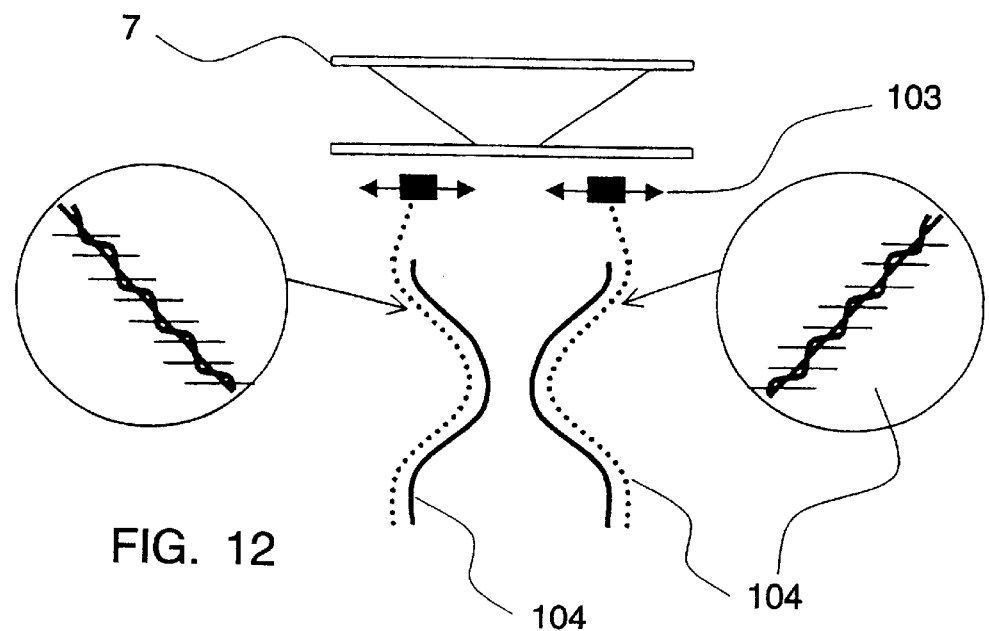
FIG. 12 illustrates weaving methods with a rapier weaving machine.

As schematically indicated in FIG. 12, the edge and resp. intermediate regions of the partial sheets have spreaders 19 arranged therein which will follow the width setting of the warp thread sheet or partial sheet as predetermined by the reeds, as described above.

Figure 13:
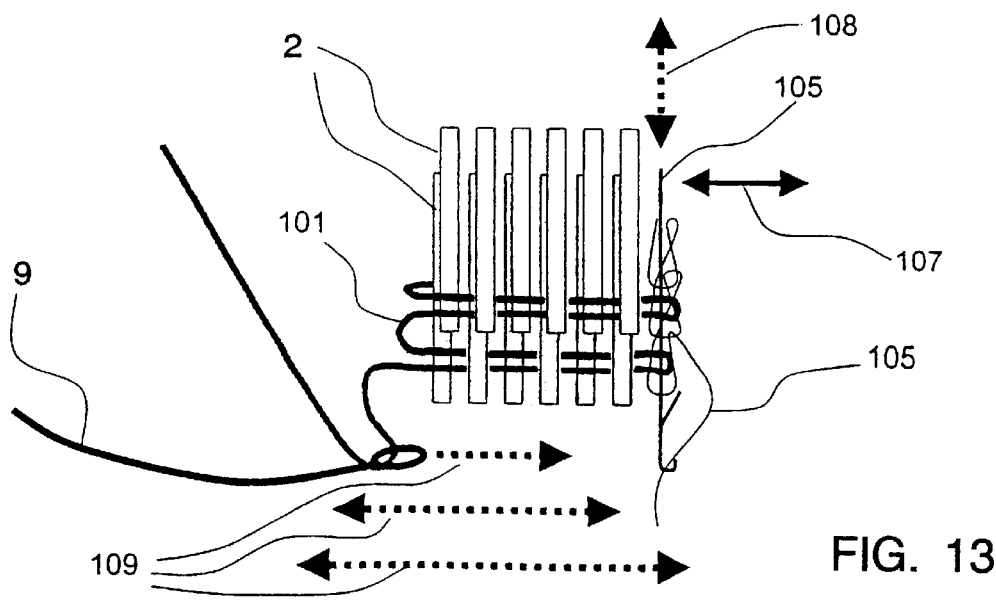
FIG. 13 illustrates a weaving method with weft needle.

As to the production of a tube-shaped fabric with a longitudinal seam, reference is made to FIGS. 13 and 16.

In FIG. 13, it is schematically indicated that the warp threads 2 are assigned to two fabric layers which alternately form the shed for the weft thread insertion. The weft thread is inserted by a weft needle 9 and at the forward end is guided in an eyelet. Thereby, the endless uncut weft thread 101 will form loops on the side of the warp thread sheet facing away from the insertion side. These loops are crocheted in a known manner or woven in another manner, thus connecting the two fabric layers by this stitch seam. As illustrated, a machine-controlled needle is used for this purpose; corresponding to the width change of the fabric, the needle also performs a lateral positioning movement 107. Further, an additional auxiliary thread can be used for stitch formation. This generation of the stitch seam can be performed by a crocheting method. In this regard, reference is made to Hans-Walter Kipp, "Bandwebtechnik" ed. JTM-Stiftung, Frick/Switzerland, publ. Sauerländer, Frankfurt a.M. 1988. In this manner, the crochet/stitch edge being generated is given a larger resistance to bursting. On the insertion side, the weft thread runs endlessly from one fabric layer to the next one and thus connects the fabric layers. In contrast to the loom with shuttle insertion of the weft thread, it is here required that the path 109 of the weft thread be adapted to the fabric width predetermined by the reed position. Use is made of a reed as described above. FIGS. 6B and 16 show a hollow fabric produced in this manner. In FIG. 16, the crochet edge is indicated by the auxiliary thread, wherein the fabric layers in this region can be additionally connected to each other by a cross weave of the warp threads. The tube according to FIG. 1C is produced by means of projectile or gripping methods according to FIG. 6B, FIG. 11 by lateral spreading and condensing of the warp threads.

What is claimed is:

1. A method of weaving a fabric having a varying width, comprising the steps of
    guiding an advancing sheet of warp threads through a reed which is displaceable to vary the warp thread spacing and thus the width of the sheet,
    displacing the reed so as to change the warp thread spacing and thus the width of the advancing sheet in accordance with a predetermined program which represents a desired fabric width which varies along the length of the sheet,
    forming an interwoven fabric by laterally interlacing a weft thread with the sheet of warp threads at a location downstream of the reed,
    engaging at least the two opposite edges of the formed interwoven fabric with spreader devices so as to impart a width guiding effect to the engaged opposite edges, and
    adjusting the width guiding effect of the spreader devices as a function of the desired fabric width.

2. The method as defined in claim 1 wherein the step of adjusting the width guiding effect of the spreader devices includes adjusting the width guiding effect synchronously and proportionally to the desired fabric width.

3. The method as defined in claim 2 wherein the step of adjusting the width guiding effect includes adjusting the lateral spacing of the spreader devices.

4. The method as defined in claim 3 wherein the spreader devices engage only the opposite edge portions of the fabric.

5. The method as defined in claim 4 comprising the further step of reciprocating the reed so as to beat-up the weft thread and the sheet of warp threads, and wherein the interwoven fabric is engaged by the spreader devices downstream of the beat-up location.

6. The method as defined in claim 1 wherein the spreader devices are selected from the group consisting of (a) freely rotatable cylindrical rollers having fabric engaging needles about the circumference thereof and positioned to engage respective edge portions of the fabric, (b) a plurality of guide rods which are mounted to permit each rod to be selectively moved into a fixed location in contact with the fabric and with the rods having differently angled helical guide grooves on the surface thereof, (c) a plurality of guide rods which are mounted to permit each rod to be selectively moved into a fixed location in contact with the fabric and with the rods having differently curved concave and/or convex outer surfaces, and (d) a pair of clamping rollers positioned to have the fabric advance therebetween along each of the opposite edge portions of the fabric.

7. The method as defined in claim 1 wherein the step of forming an interwoven fabric includes interlacing the warp and weft threads so that a plurality of adjacent warp threads are guided without mutual tying by the weft threads.

8. The method as defined in claim 1 wherein the step of forming an interwoven fabric includes forming a plurality of overlying layers of warp threads which are interlaced by an uncut weft thread to form a woven tube.

9. The method as defined in claim 8 wherein the edge regions of the fabric are reinforced by a reinforcing edge formation.

10. The method as defined in claim 1 wherein the step of forming an interwoven fabric includes forming a plurality of overlying layers of warp threads with the layers forming edge regions of the fabric bound by the weft thread while a central region of the fabric width is open.

11. The method as defined in claim 1 wherein the step of guiding an advancing sheet includes dividing the sheet into a plurality of partial sheets which are guided through a separate reed which is independently controllable, wherein the partial sheets are jointly bound by a weft thread inserted across the entire width of the advancing sheet, and wherein the central region of each partial sheet is alternately opened into a shed so that the weft thread alternately interlaces the resulting upper and lower layers.

12. The method as defined in claim 11 wherein each partial sheet is independently guided into a desired width and so that the total width of adjacent partial sheets remains substantially constant.

13. The method as defined in claim 11 wherein the regions of the inserted weft thread are cut between adjacent partial sheets.

14. The method as defined in claim 1 wherein the step of forming an interwoven fabric includes guiding the warp sheet to form upper and lower layers which are alternately opened into a shed, and guiding the weft thread through each shed so as to interlace the upper and lower layers into the fabric and connect the layers in one of the edge regions in a seamless manner while forming loops in the other edge region, and interconnecting the loops with a stitch formation.

15. The method as defined in claim 14 wherein the stitch formation is reinforced by a reinforcing device whose position is continuously adapted to the width of the fabric.

16. The method as defined in claim 1 comprising the further step of drawing off the sheet of warp threads with a varying speed across the width of the fabric, with the speed of drawing off of individual warp threads, or groups of warp threads, being separately controlled.

17. The method as defined in claim 1 comprising the further step of generating a variable width of the fabric by removal and/or the addition of warp threads.

18. The method as defined in claim 1 comprising the further step of controlling the tension of the weft thread so as to control the width of the fabric.

19. A weaving apparatus for producing a fabric having a varying width, comprising a warp supply for supplying a plurality of warp threads, a draw-off mechanism for advancing the warp threads in the form of a sheet from the warp supply, a jacquard head for raising and lowering the warp threads in the advancing sheet to form weaving sheds in which a weft thread may be laid to form an interwoven fabric, a reed positioned downstream of the jacquard head and being displaceably mounted so as to permit the lateral spacing of the warp threads in the sheet and thus the width of the fabric to be varied, spreader means positioned to engage at least the two opposite edges of the fabric and being configured to impart a width guiding effect to each of the engaged opposite edges, and a control for displacing the reed in accordance with a predetermined program which represents a desired fabric width which varies along the length of the sheet and for adjusting the width guiding effect of the spreader means as a function of the desired fabric width.

20. The apparatus as defined in claim 19 wherein the spreader means comprises a pair of spreader devices positioned to engage respective opposite side edges of the formed fabric, and means mounting the spreader devices for controlled movement in a lateral direction.

21. The apparatus as defined in claim 16 wherein the draw off mechanism comprises a take up roller positioned downstream of the spreader means.

22. The apparatus as defined in claim 19 wherein the reed comprises a plurality of laterally spaced apart dents, with each of the dents having a substantially elliptical cross section.

23. The apparatus as defined in claim 19 wherein the reed comprises a plurality of laterally spaced apart dents, with each of the dents being supported for rotation about its longitudinal axis.

24. The apparatus as defined in claim 19 wherein the reed comprises a plurality of main dents disposed in a fan like arrangement, and a plurality of additional dents disposed between the main dents so as to be aligned with the main dents in the portion of most narrow separation of the main dents so as to have no guiding function, and so as to be disposed between adjacent main dents in the portion of most wide separation of the main dents.

25. A The method as defined in claim 13 comprising the further step of reinforcing the cut regions between adjacent partial sheets by a reinforcing edge formation, which is formed by a reinforcing device whose position is continuously adapted to the width of the fabric.

* * * * *

UNITED STATES PATENT AND TRADEMARK OFFICE
CERTIFICATE OF CORRECTION

PATENT NO.     : 6,575,201 B2                                                                 Page 1 of 1
DATED          : June 10, 2003
INVENTOR(S)    : Buesgen It is certified that error appears in the above-identified patent and that said Letters Patent is hereby corrected as shown below:

Title page,
Item [56], References Cited, U.S. PATENT DOCUMENTS,
"Verne et al." should read -- Matthews --.

Column 16,
Line 8, after "the" cancel the comma (,).

Column 18,
Line 3, "claim 16" should read -- claim 19 --.

Signed and Sealed this

Fourteenth Day of October, 2003

JAMES E. ROGAN
*Director of the United States Patent and Trademark Office*